United States Patent [19]

Malmbom et al.

[11] Patent Number: 5,629,364
[45] Date of Patent: May 13, 1997

[54] COATING COMPOSITION

[75] Inventors: Lars Malmbom; Lennart Lysell, both of Sundsvall, Sweden

[73] Assignee: Casco Nobel AB, Stockholm, Sweden

[21] Appl. No.: 553,982

[22] Filed: Nov. 6, 1995

Related U.S. Application Data

[60] Provisional application No. 60/000,331 Jun. 19, 1995.

[30] Foreign Application Priority Data

Nov. 14, 1994 [SE] Sweden ................................ 9403893

[51] Int. Cl.$^6$ .................................. C08J 9/16; C08J 9/22
[52] U.S. Cl. ....................... 523/219; 523/210; 523/218; 523/220; 521/76; 521/78; 524/527
[58] Field of Search ..................... 521/76, 78; 523/210, 523/218, 219, 220; 524/527

[56] References Cited

U.S. PATENT DOCUMENTS

| | | | |
|---|---|---|---|
| 3,615,972 | 10/1971 | Morehouse, Jr., et al. | 523/210 |
| 4,108,806 | 8/1978 | Cohrs et al. | 521/54 |
| 4,946,737 | 8/1990 | Lindeman et al. | 523/218 |
| 5,132,054 | 7/1992 | Stahl | 252/606 |
| 5,212,215 | 5/1993 | Nanri et al. | 523/218 |
| 5,356,957 | 10/1994 | Nanri et al. | 523/218 |
| 5,520,961 | 5/1996 | Lysell et al. | 427/385.5 |

FOREIGN PATENT DOCUMENTS

| | | |
|---|---|---|
| 341330 | 11/1989 | European Pat. Off. . |
| 0559254 | 8/1993 | European Pat. Off. . |
| 85-281981 | 6/1987 | Japan . |
| 2251439 | 7/1992 | United Kingdom . |
| 93/24581 | 12/1993 | WIPO . |

*Primary Examiner*—Paul R. Michl
*Assistant Examiner*—Olga Asinovsky
*Attorney, Agent, or Firm*—Burns, Doane, Swecker & Mathis, L.L.P.

[57] ABSTRACT

A coating composition is based on polyvinyl chloride plastisol containing thermoplastic microspheres and is suitable for use as underbody compound for vehicles. The coating composition contains a mixture of expandable and expanded microspheres, in which the expandable microspheres expand at a temperature in the vicinity of the temperature at which the expanded microspheres begin to collapse. The mixture of microspheres solves the problem of a varying density of the coating when the plastisol is gelatinated.

10 Claims, No Drawings

COATING COMPOSITION

The present invention relates to a new coating composition based on vinyl chloride polymer plastisol and using thermoplastic microspheres as filler. To be more specific, the invention concerns coating compositions that are especially suitable for use as undercoating for vehicles. The inventive composition comprises thermoplastic expandable microspheres having a polymer shell based on nitrile-containing monomers, as well as expanded microspheres of low density. The invention further concerns the use of the coating composition.

It is well-known to treat chassis and other exposed car components with coating compositions in order to protect them against rust and stones flying up from the road. Conventional coating compositions usually consist of bituminous material or plastisol-based coating compositions. Also, it is a well-known fact that polyvinyl chloride plastisols having an improved resistance against stones flying up from the road as well as a lower weight can be obtained by using thermoplastic expanded microspheres of low density as filler in the plastisol composition (see, for instance, DE 4,018,022 and JP 85-281,981). Expandable microspheres also serve to reduce the weight of the plastisol (see, for instance, WO 93/24581).

When employed as coating compositions for cars, plastisols are gelatinated in ovens used for curing/drying the car paint. As a rule, the car body is repainted, and thus dried in a drying oven several times.

One application problem is that the thickness of the plastisol varies on different parts of the car body. Another problem is that the temperature in the oven varies, resulting in a varying heat transfer/gelatination of the plastisol. When thermoplastic microspheres are used in the plastisol, the gelatinated product will get a varying density. This applies to plastisols with expanded thermoplastic microspheres, as well as to plastisols with expandable thermoplastic microspheres.

As set forth in the appended claims, the present invention relates to a coating composition, which is based on a vinyl-chloride-polymer-based plastisol comprising expandable thermoplastic microspheres as well as expanded microspheres. The microspheres have such thermomechanical properties that the expandable microspheres expand at a temperature in the vicinity of the temperature at which the expanded microspheres begin to collapse. Preferably, the expandable microspheres undergo an expansion process beginning at a temperature at which their increase in volume compensates for the decrease in volume taking place when the expanded microspheres collapse.

The inventive composition is especially suitable for use as an undercoating for cars, but it may well be used also as protective coating for other surfaces.

It has now surprisingly been found that the above problems can be solved by using a mixture of expanded and expandable microspheres in the plastisol.

The coating composition according to the invention exhibits no density variations or only insignificant density variations after gelatination. The density and the decrease in weight associated therewith are important factors in the present application. A mixture of expanded and unexpanded thermoplastic microspheres has a levelling effect, since the recipe can be based both ion the low density of the expanded microspheres and on the expansion found in the expandable microspheres. The same density is obtained within an extremely broad range of different temperatures as well as gelatination temperatures.

The thermoplastic microspheres used in the plastisol-based composition according to the invention have a polymer shell enclosing an expanding agent. The polymer shell may consist of a copolymer of monomers selected from the group: acrylonitrile, methacrylonitrile, alpha-chloroacrylonitrile, alpha-ethoxyacrylonitrile, fumaronitrile, vinylidene chloride, vinyl chloride, methacrylic ester, acrylic ester, styrene, vinyl acetate, butadiene, neoprene and mixtures thereof. The thermoplastic microspheres may be produced in conventional fashion, for instance as sen forth in U.S. Pat. No. 3,615,972.

The particle size of the expandable and expanded thermoplastic microspheres may vary. Thus, the particle size of the unexpanded microspheres may range from 1 μm to 1 mm, preferably from 2 μm to 0.5 mm, and especially from 5 μm to 60 μm.

The expanded microspheres may have a diameter which is about 2–5 times as large. The expanded microspheres have a density below 100 kg/m$^3$.

Expandable thermoplastic microspheres are distinguished by their capacity to begin to expand at a certain temperature ($T_{start}$). They then increase in volume when the temperature is raised, up to a certain temperature ($T_{max}$), at which the increase in volume stops. A further temperature increase then results in a decrease in volume, resulting from the collapse of the microspheres. This expansion process is irreversible.

Since the increase in volume of the expandable thermoplastic microspheres is due not only to the temperature, but also to the rate of heating, the counterpressure at the expansion if any and so forth, $T_{start}$ and $T_{max}$ are determined by a thermomechanical analysis as follows: The sample is placed in a cup, and a movable rod is lowered towards the sample. The rod is loaded with a specific weight. Heating of the cup is begun, such that the temperature in the cup increases linearly with respect to time. The vertical movements of the rod are recorded and indicate the increases and decreases in volume of the sample. $T_{start}$ is the temperature at which the rod begins to ascend, i.e. when expansion begins, and $T_{max}$ is the temperature at which the rod reaches its maximum height, i.e. when the sample attains maximum volume after the expansion has ceased but before the microspheres have begun to collapse. When the temperature is raised further, the microspheres will begin to collapse, and the volume decreases.

The expanded microspheres are so chosen that their $T_{max}$ is lower than the $T_{max}$ of the expandable microspheres used in the plastisol. Preferably, the $T_{start}$ of the expandable microspheres is so chosen as to be 0°–40° C. below the $T_{max}$ of the expanded microspheres.

This results in an even density, since the expandable microspheres expand and thus give rise to a decrease in density within the temperature range in which the expanded microspheres collapse and thus give rise to an increase in density. By choosing a suitable mixing ratio the plastisol is given an even density over a broad temperature range.

The expandable microsphere is so chosen as to maintain a low density also at high temperatures. Suitably, the expandable microsphere is so chosen that its $T_{max}$ is above 140° C., preferably in the range of 150°–250° C., and most preferred in the range of 170°–220° C.

Suitably, the expanded microspheres are so chosen that their $T_{max}$ is above 100° C., but below the $T_{max}$ of the expandable microspheres.

Microspheres possessing the above properties are commercially available. Examples of expandable microspheres are, for instance, microspheres the polymer shell of which comprises at least 80% by weight of nitrile-containing monomers, and most preferably comprises from about 85% by weight to about 97% by weight of nitrile-containing monomers, a content of up to 100% by weight being, however, conceivable. The other monomers should be essentially halogen-free and be present in an amount which falls below about 20% by weight and preferably ranges from about 3% by weight to about 15% by weight. By the expression "essentially halogen-free polymer shell" is meant that the copolymer, apart from nitrile-containing monomers and halogen-free monomers, may contain less than 2% by weight of halogen-containing monomers, such as vinyl chloride or vinylidene chloride. Preferably, the copolymer comprises no halogen-containing monomers at all. It has been found that this type of microspheres is stable in polyvinyl chloride plastisols, even during prolonged gelatination at high temperatures. As examples of expanded microspheres, mention may be made of those microspheres whose polymer shell comprises at least 45% by weight of acrylonitrile-containing monomers.

PVC plastisols chiefly consist of vinyl-chloride-based polymers, plasticisers, fillers, stabilisers, pigments and adhesion promoters. The plastisol is obtained by dispersing a vinyl-chloride-based polymer in the plasticiser and the filler, whereupon additives are admixed. By vinyl-chloride-based polymers are meant homopolymers, such as polyvinyl chloride or polyvinylidene chloride, or copolymers of vinyl chloride or vinylidene chloride containing up to 20% by weight, based on the vinyl chloride or the vinylidene chloride, of copolymerisable monomers, such as alkenes, vinyl acetate, vinylidene chloride, acrylic acid or methacrylic acid, acrylates or methacrylates, vinyl esters, and so forth.

Compounds commonly used as plasticisers comprise phthalic esters, dibasic esters, phosphoric esters, polyester-based plasticisers and especially dioctyl phthalate and diisononyl phthalate.

Conventional fillers are talc, calcium carbonate, kaolin, barium sulphate, magnesium carbonate, graphite, silicon dioxide, rubber, and so forth.

The amount of thermoplastic microspheres added to the plastisol may vary according to the aimed-at properties of the finished coating. An increase in the amount of microspheres will result in a decrease in the density of the coating. However, there is a risk that the mechanical strength of the coating will be reduced if the microsphere content of the plastisol is too considerable. As a guiding principle, it may be mentioned that the thermoplastic microspheres may be added to the plastisol in an amount of 0.1–5% by weight, preferably 0.5–2% by weight, based on the weight of the plastisol. These contents strike a balance between low density and good mechanical properties. The weight ratio of expanded microspheres to expandable microspheres may be 1:9–9:1. Suitably, this ratio is 3:1–1:3, preferably 1:1.5–1.5:1.

The coating composition is produced by mixing the dry, unexpanded and expanded microspheres with the plastisol. The resulting composition is applied to the surface to be coated and is gelatinated at a temperature of about 100°–180° C., preferably 120°–150° C. The gelatination time may range from a few minutes up to just over an hour, and preferably is about 10–40 minutes.

The coating composition is especially suited for use as anti-corrosive and stone-protecting coating material for vehicles. When the coating composition is gelatinated for shorter or longer periods than indicated, the density will vary to a much lesser extent than is the case when use is made of plastisols containing only expandable or only expanded microspheres.

The plastisol as such consists of a conventional plastisol composition. The following composition may be indicated:

| | |
|---|---|
| vinyl-chloride-based polymer | 10–50% by weight |
| plasticiser | 20–50% by weight |
| filler | 10–50% by weight |
| viscosity regulator | 1–10% by weight |
| stabiliser | 1–10% by weight |

Mixtures of different polymers as well as plasticisers and fillers may be used. As viscosity regulator, use is made of e.g. silicon dioxide. The stabilisers employed usually consist of metal salts, such as dibutyl tin carboxylate and tribasic lead sulphate. In addition, adhesion chemicals, such as triethylenetetraamine, may be added.

The invention will now be described in more detail by means of the following Example, which is not to be regarded as limiting the scope of the invention. The figures in parts and percent given in the Example are all by weight, unless otherwise stated.

EXAMPLE

A plastisol of the following composition was produced.

| | |
|---|---|
| PVC copolymer (with 5% vinyl acetate: Vinnol® E5/65 L) | 213 |
| PVC copolymer (with 8% vinyl acetate: Vinnol® C8/62 V) | 60 |
| diisononyl phthalate | 390 |
| filler (of CaCO₃-type: Durcal® 5) | 200 |
| filler (of CaCO₃-type: Socal® P2) | 123 |
| viscosity regulator (silicon dioxide: Aerosil® 200) | 10 |
| tin stabiliser (dibutyl tin carboxylate: Irgastab® T9 | 4 |

1–1.5% of an adhesion chemical in the form of triethylenetetraamine (Euretec® 505) was also added to the composition.

The plastisol was prepared in conventional fashion by dispersing the polymer in the plasticiser and then adding the fillers and the other additives. To this composition was admixed 0.5% by weight of expandable microspheres, the polymer shell of which consisted of 90% acrylonitrile and methacrylonitrile, 10% methyl methacrylate, EXPANCEL® 091 DU, as well as 0.5% by weight of expanded microspheres, the polymer shell of which consisted of 45% nitrile-containing monomers, EXPANCEL 461 DE. EXPANCEL 461 DE had a $T_{max}$ of 148° C. and a $T_{start}$ of 107° C., and EXPANCEL 091 DU had a $T_{start}$ of 128° C. and a $T_{max}$ of 184° C. The thermomechanical measurements were performed in a Mettler TMA 40, available from Mettler Instruments AG, Switzerland. The load on the quartz rod was 6 g, and the temperature increase was 20° K./min.

For comparative purposes, plastisols were mixed with expandable microspheres EXPANCEL 091 DU only, as well as with expanded microspheres EXPANCEL 461 DE only.

The coating compositions were gelatinated at a temperature of 120°–150° C., and the densities were measured every 10 minutes. The following densities were measured:

| | EXPANCEL 091 DU and EXPANCEL 461 DE | EXPANCEL 091 DU | EXPANCEL 461 DE |
|---|---|---|---|
| Density (g/cm³) at 120° C. | | | |
| 10 min. | 0.93 | 1.10 | 0.75 |
| 20 min. | 0.94 | 1.07 | 0.76 |
| 30 min. | 0.95 | 1.06 | 0.78 |
| 40 min. | 0.96 | 1.05 | 0.82 |
| Density (g/cm³) at 130° C. | | | |
| 10 min. | 0.94 | 0.98 | 0.76 |
| 20 min. | 0.98 | 0.97 | 0.89 |
| 30 min. | 1.00 | 0.96 | 0.96 |
| 40 min. | 1.01 | 0.95 | 1.02 |
| Density (g/cm³) at 140° C. | | | |
| 10 min. | 0.99 | 0.92 | 0.90 |
| 20 min. | 0.99 | 0.88 | 1.02 |
| 30 min. | 0.99 | 0.87 | 1.08 |
| 40 min. | 1.00 | 0.87 | 1.09 |
| Density (g/cm³) at 150° C. | | | |
| 10 min. | 0.97 | 0.87 | 0.91 |
| 20 min. | 0.96 | 0.88 | 1.01 |
| 30 min. | 0.98 | 0.90 | 1.03 |
| 40 min. | 1.00 | 0.93 | 1.06 |

As appears from the Table, the density of a plastisol containing both expanded (EXPANCEL 461 DE) and expandable microspheres (EXPANCEL 091 DU) is much more stable than that of plastisols containing only expandable or expanded microspheres. At gelatination conditions of 120°–150° C. and 10–40 minutes, the density of the plastisol containing only expanded microspheres EXPANCEL 461 DE varies between 0.75 g/cm³ and 1.10 g/cm³. The density of the plastisol containing only expandable microspheres EXPANCEL 091 DU varies between 0.87 g/cm³ and 1.10 g/cm³. The variation in density of the plastisol containing expandable as well as expanded microspheres is merely 0.93–1.01 g/cm³ under the gelatination conditions indicated above. The two types of microspheres complement each other and provide for a much smaller variation in plastisol density, thus widening the field of application of the plastisol, as varying gelatination conditions no longer put any obstacles in the way of a stable plastisol density.

We claim:

1. A coating composition which is based on polyvinylchloride plastisol containing thermoplastic microspheres and which is suitable for use as an undercoating for vehicles, wherein it comprises a mixture of expandable and expanded microspheres, and in that said expandable microspheres expand at a temperature in the vicinity of the temperature at which the expanded microspheres begin to collapse.

2. A coating composition as claimed in claim 1, wherein the plastisol comprises a mixture of expanded microspheres and expandable microspheres, and in that said thermoplastic expandable microspheres undergo an expansion process beginning at such a temperature that the increase in volume compensates for the decrease in volume taking place when the expanded microspheres collapse.

3. A coating composition as claimed in claim 1, wherein the thermoplastic, expanded and expandable microspheres are present in an amount of 0.1–5.0% by weight, based on the weight of the plastisol.

4. A coating composition as claimed in claim 1, wherein thermoplastic, expanded and expandable microspheres are present in an amount of 0.5–2.0% by weight, based on the weight of the plastisol.

5. A coating composition as claimed in claim 1, wherein the weight ratio of expanded microspheres to expandable microspheres is 1:9–9:1.

6. A coating composition as claimed in claim 1, wherein the weight ratio of expanded microspheres to expandable microspheres is 3:1–1:3.

7. A coating composition as claimed in claim 1, wherein the thermoplastic expandable microspheres have a $T_{max}$ above 140° C.

8. A coating composition as claimed in claim 1, wherein the thermoplastic expandable microspheres have a $T_{max}$ between 150° C. and 250° C.

9. A coating composition as claimed in claim 1, wherein the thermoplastic expandable microspheres have a $T_{max}$ between 170° C. and 220° C.

10. A method of providing a vehicle with an anti-corrosive and stone-protecting coating mass, by applying onto said vehicle the coating composition according to claim 1.

* * * * *